United States Patent [19]

Frush et al.

[11] 4,421,060
[45] Dec. 20, 1983

[54] NIPPLE WATERER

[75] Inventors: Don R. Frush, Warsaw, Ind.; Keith B. Coffman, Harrisonburg, Va.

[73] Assignee: Chore-Time Equipment, Inc., Milford, Ind.

[21] Appl. No.: 304,843

[22] Filed: Sep. 23, 1981

[51] Int. Cl.³ .................. A01K 7/06; A01K 39/04
[52] U.S. Cl. .................... 119/72.5; 119/51.5
[58] Field of Search ............ 119/51.5, 72, 72.5, 119/75; 251/143, 152

[56] References Cited

U.S. PATENT DOCUMENTS

| | | | |
|---|---|---|---|
| 2,193,258 | 3/1940 | Shaw et al. | 119/72.5 |
| 3,263,652 | 8/1966 | Nakajima et al. | 119/72.5 |
| 3,476,088 | 11/1969 | Smith | 119/72.5 |
| 3,477,471 | 11/1969 | Mallinson | 137/614.18 |
| 3,527,193 | 9/1970 | Smith | 119/72.5 |
| 3,550,560 | 12/1970 | Edstrom | 119/72.5 |
| 3,646,955 | 3/1972 | Olde | 137/382 |
| 3,707,949 | 7/1970 | Lippi | 119/18 |
| 4,221,188 | 9/1980 | Hostetler | 119/72 |

FOREIGN PATENT DOCUMENTS 1550318 9/1969 Fed. Rep. of Germany ..... 119/72.5

Primary Examiner—Robert P. Swiatek
Attorney, Agent, or Firm—Trexler, Bushnell & Wolters, Ltd.

[57] ABSTRACT

A nipple valve-type waterer is provided for a live stock watering system. This nipple valve comprises a generally cylindrical, tubular valve body of greater diameter than a tubular, water delivery manifold. The tubular valve body is provided in two valve body halves which interfit in surrounding relation with the manifold. The manifold is provided with a pair of coaxially aligned through openings, while a through axial bore in each tubular valve body half is coaxially aligned with one of these manifold through openings as the valve body halves are fitted in surrounding relation to the manifold. The nipple valve also provides a flow path for guiding water from the supply manifold to and through the valve body, and seals are carried in the valve body for preventing leakage between the manifold and the valve where they interfit.

17 Claims, 6 Drawing Figures

U.S. Patent  Dec. 20, 1983  Sheet 1 of 2  4,421,060
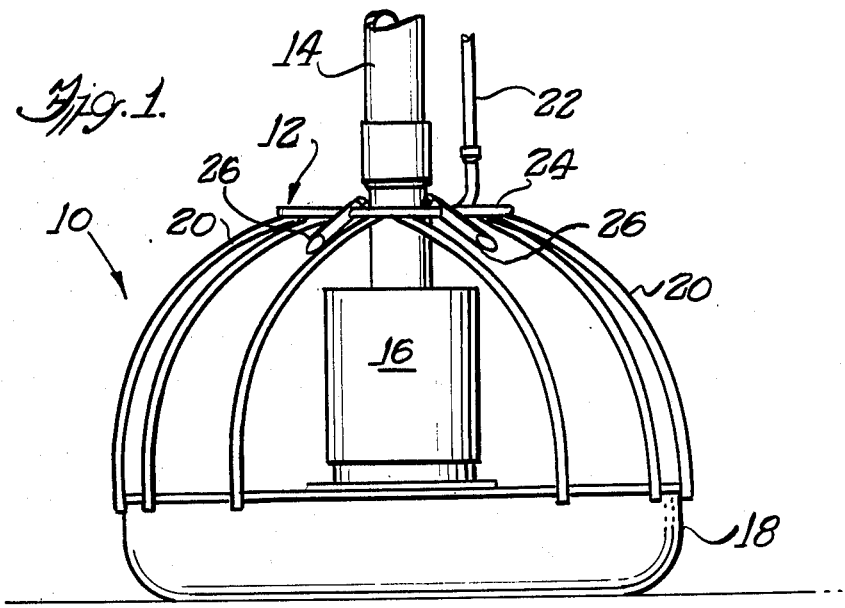
Fig. 1.
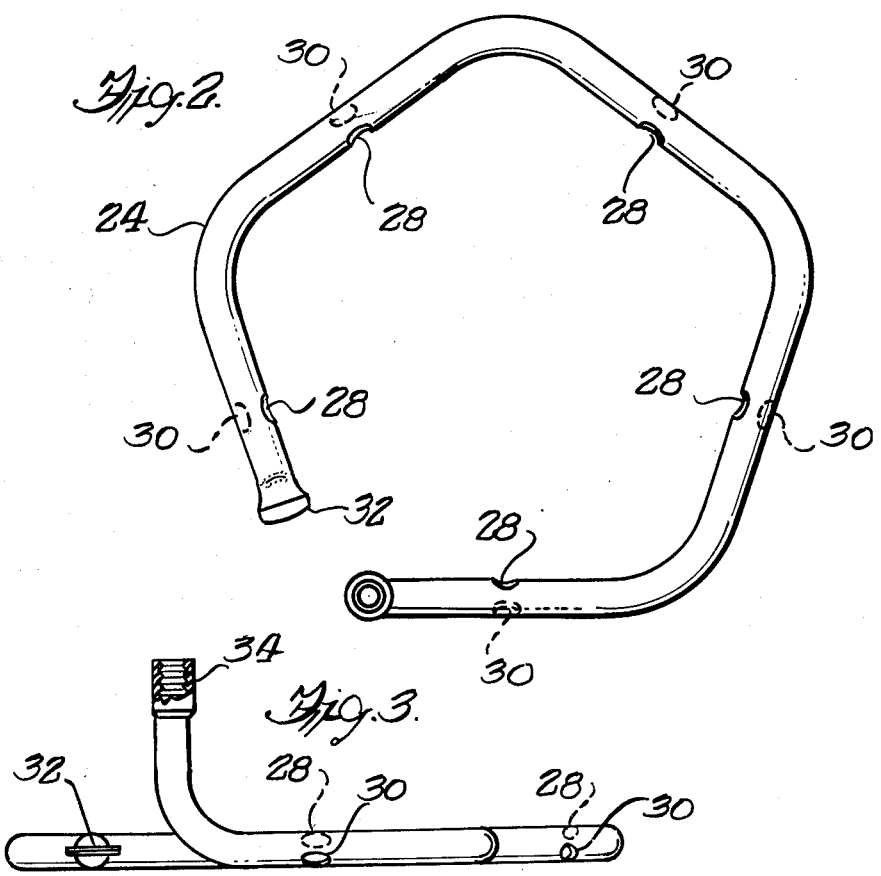
Fig. 2.
Fig. 3.

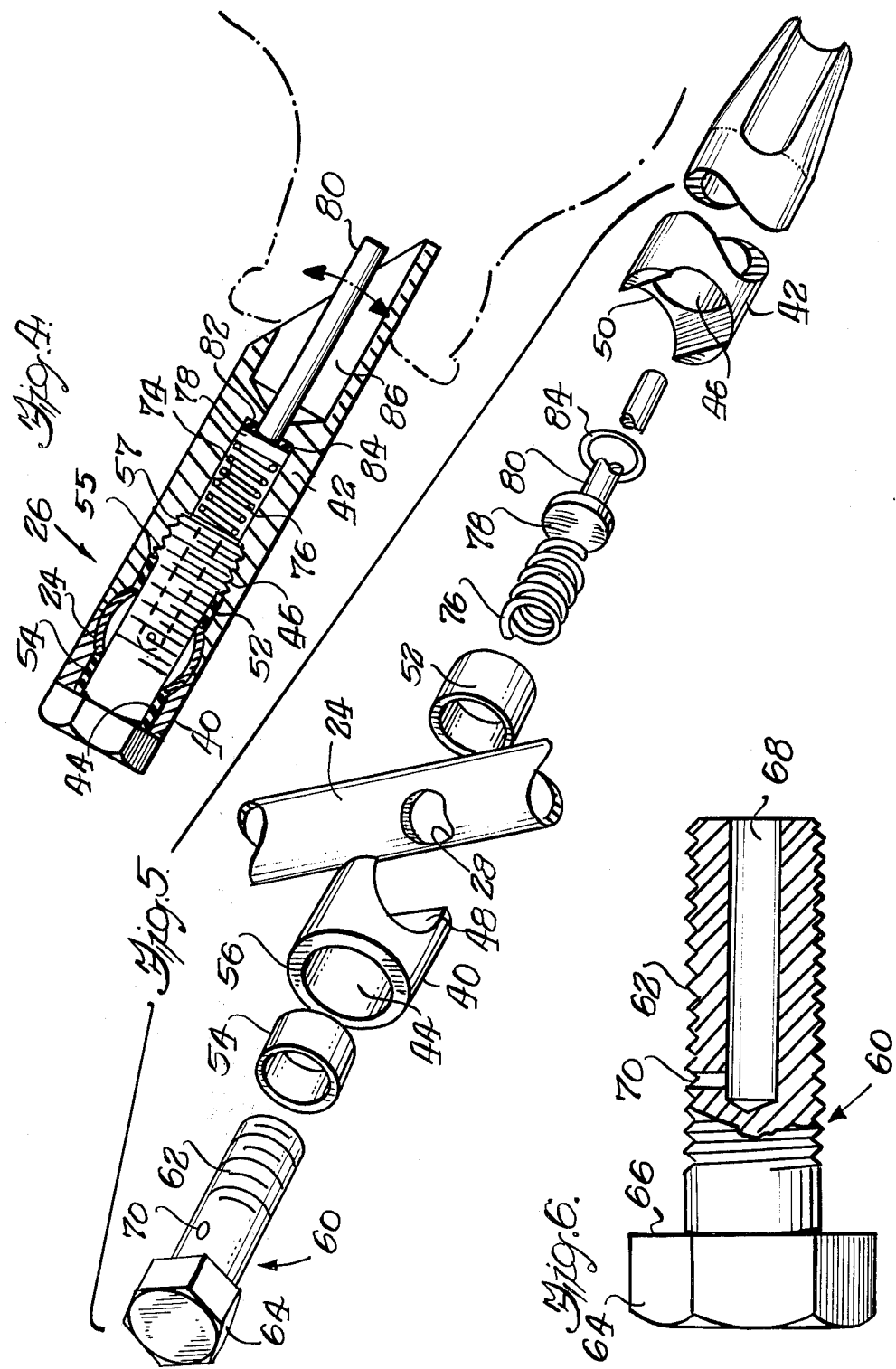

NIPPLE WATERER

BACKGROUND OF THE INVENTION

The present invention is directed to a nipple valve-type of waterer for livestock and more particularly to novel and improved structure for joining such a nipple valve-type waterer with a water supply pipe or manifold.

Nipple valve-type waterers for livestock are generally well known in the art. Such nipple valve-type waterers conventionally include a generally tubular valve body which carries a downwardly-angled, outwardly-extending stem adapted to be pivoted laterally by an animal, thereby causing the valve to move from an otherwise sealed condition to allow water to flow therethrough to the animal. In this regard, a compression spring or other suitable means coacts with a valve head carried integrally with the valve stem to remain seated relative to a valve seat and thereby close the valve in the absence of pivoting pressure applied to the stem by an animal.

Heretofore, such nipple valves have generally been provided with fittings such as screw-type threads, or barb-like press-in fittings to accomplish joining of the nipple valve body with a water supply pipe or manifold provided with a mating fitting. However, such fittings are relatively expensive and require extra steps in the manufacture of both the nipple valve and the water supply pipe or manifold. It will be recognized in this regard that one such mating fitting must be provided at each point in a water supply line or manifold at which a nipple valve is to be fitted, thus adding considerably to the expense of manufacturing and/or installing such a water supply line or manifold and plural associated nipples. Additionally, care must be taken to properly interengage the mating fittings on both water supply pipe and nipple valve to prevent leakage, and thus assure adequate pressure and reliable delivery of water in response to animal pressure upon the nipple valve.

OBJECTS AND SUMMARY OF THE INVENTION

Accordingly it is a general object of the invention to provide a novel and improved nipple valve-type waterer for livestock.

A more specific object is to provide such a nipple valve-type waterer which is adapted for a relatively simple and inexpensive, and yet reliable, leak-proof interconnection with a water supply pipe or manifold.

A further object is to provide such a nipple valve-type waterer which requires neither a specialized fitting on the nipple valve nor a mating fitting on the water supply pipe or manifold to achieve this interconnection.

A related object is to provide a nipple valve-type and interconnection waterer arrangement of the foregoing type which is relatively simple and inexpensive in its design and manufacture and yet highly reliable in operation.

Briefly, and in accordance with the foregoing objects, the present invention provides a nipple valve for use with a substantially cylindrical, tubular manifold. This nipple valve comprises a generally cylindrical, tubular valve body of greater diameter than a tubular water delivery manifold and including means for interfitting in surrounding relation with the manifold. The manifold is provided with at least one through opening in a peripheral wall portion thereof and a through axial bore defined in the cylindrical, tubular valve body is aligned with the through opening in the manifold. Means are provided for defining a flow path from the water supply manifold to and through the valve body. Sealing means are also provided for causing sealing engagement between the valve body and the manifold to thereby restrict the flow of water to and through the flow path defining means and prevent leakage.

BRIEF DESCRIPTION OF THE DRAWINGS

The foregoing, as well as other objects, features and advantages of the invention will be more readily appreciated upon consideration of the following detailed description of the illustrated embodiment, together with the accompanying drawings, wherein:

FIG. 1 is a somewhat schematic illustration of a hog-feeding station in conjunction with which the nipple valve of the present invention may be utilized;

FIG. 2 is a top plan view of an exemplary water supply pipe or manifold with which the nipple valve of the invention may be utilized;

FIG. 3 is a side elevation of the manifold of FIG. 2;

FIG. 4 is a side elevation, partially in section, of a nipple valve in accordance with the invention;

FIG. 5 is an exploded perspective view of the nipple valve of FIG. 4, illustrating the manner of interconnection thereof with the manifold of FIG. 2 and FIG. 3; and FIG. 6 is a side elevation, partially cut away and partially in section of a fastener member forming a part of the nipple valve of the invention.

DETAILED DESCRIPTION OF THE ILLUSTRATED EMBODIMENT

Referring now to the drawings, and initially to FIG. 1, there is seen an exemplary hog-feeding station, designated generally by the reference number 10, in conjunction with which a watering apparatus, designated generally by the reference numeral 12, including nipple valves in accordance with the invention, is advantageously utilized. Briefly, solid feed material may be distributed by suitable means through a tube 14 to a distribution mechanism 16 which distributes the feed evenly about a feed pan 18. This feed pan 18 may then be utilized to feed several hogs. To this end, a grill 20 is also provided to define a number of separate feeding stations in the pan 18. The watering apparatus includes a water supply line or pipe 22, which feeds a manifold 24, which in turn supplies water to a plurality of nipple valve-type waterers 26. These nipple valve-type waterers 26 are preferably fewer in number than the feeding stations defined by the grill 20 and hence one such nipple valve 26 is provided at every other such feeding station.

Referring to FIGS. 2 and 3, the manifold 24, in accordance with the illustrated embodiment, will be seen to comprise a generally cylindrical, tubular pipe formed into a generally pentagonal configuration. In the illustrated embodiment, ten feeding stations are provided in the feeder 10 of FIG. 1, and hence the pentagonal shape of the manifold provides five watering stations, one for every other feeding station. However, other manifold configurations may readily be utilized without departing from the invention. In the illustrated embodiment, a suitable closure such as a plug member 32 is provided at the distal end of the manifold 24 and a suitable fitting 34 is provided at the supply end of the manifold 24 for coupling with the water supply line or pipe 22 of FIG. 1. However, neither of these features forms any part of the present invention.

In accordance with the invention, at each point on the manifold 24 at which it is desired to provide a nipple valve 26, there is provided a pair of through openings or apertures, for example 28, 30 in the peripheral wall of the manifold 24. More particularly, these through apertures or openings 28 and 30 are generally circular and are coaxially aligned at generally opposing surfaces of the peripheral wall of the manifold 24.

It will be noted that these coaxially aligned through apertures 28 and 30 are formed on an axis which is tilted generally downwardly with respect to the plane of the pentagonal manifold 24. Accordingly, as best viewed in FIG. 1, the interfitting nipple valves are also tilted somewhat downwardly, on the same axis, for convenient presentation to the livestock for watering purposes.

Reference is next invited to FIGS. 4 and 5 wherein the nipple valve 26 in accordance with the invention and the novel structure for interconnecting this nipple valve 26 with a supply pipe such as the manifold 24 are illustrated in detail. In accordance with a feature of the invention, the nipple valve 26 is adapted to interconnect with the supply line or manifold 24 without requiring specialized fittings on the manifold 24. Hence, only the apertures 28 and 30 need be formed in the manifold in those places at which it is desired to affix a nipple valve 26.

Referring now more particularly to FIG. 4 and FIG. 5, it will be seen that the nipple waterer 26 comprises a valve body or housing made up of two valve body or housing halves 40, 42. Each of these valve body halves 40, 42 comprises a substantially cylindrical, tubular member, having a through axial bore 44, 46. In accordance with a feature of the invention, one axially outer end face of each of these housing halves 40, 42 is formed in a substantially concave or arcuate configuration, as generally indicated by reference numerals 48 and 50. In the illustrated embodiment the concavity of each of these faces 48, 50 defines substantially one half of a right cylinder which is of similar radius or diameter to the cylindrical cross-sectional outer diameter of the supply pipe or manifold 24. Accordingly, these two end faces 48 and 50 interfit in surrounding engagement with the supply pipe or manifold 24.

Moreover, these faces will be seen to intersect the respective through axial bores 44 and 46 of the housing halves 40 and 42, whereby these bores 44 and 46 are aligned along a common axis with the coaxial through aperatures 28 and 30 of the manifold 24, upon the placement of each valve body half 40, 42 in surrounding engagement with the manifold 24. Preferably, the diameter through bores 44 and 46 of the respectively valve body halves 40 and 42 are at least, where they intersect the faces 48, 50, equal to or greater than the diameter of the through apertures 28 and 30 in the manifold 24, so as to be aligned in substantially surrounding, coaxial relationship therewith.

In accordance with another feature of the invention, a sealing arrangement is provided for sealing the junction or intersection of the manifold 24 with the valve body or housing halves 40 and 42 of the nipple valve 26. To this end, a pair of substantially similar cylindrical, tubular seal members, formed from an elastomeric material such as a rubber or rubber-like substance, are proivded. Cooperatively, as best viewed in FIG. 4, the bore 46 of the housing half 42 is provided with a radially inwardly extending step or shoulder 55 for accommodating and positioning the seal member 52. Cooperatively, the axial length of this seal member 52 is slightly greater than the axial length of the bore 46 from the shoulder 55 to the face 50 of the valve body half 42. Accordingly, as will be seen later, when the valve body or housing half 42 is urged against the manifold 24, the sealing member 52 is compressed slightly to form an effective seal therebetween, around the aperture 30. In like fashion, the axial length of the second seal member 54 is somewhat greater than the effective axial length of the housing half 40 from a generally flat, outer open end 56 thereof to the termination of the through bore 44 in the face 48 thereof to afford similar sealing action with respect to the through aperture 28 of the manifold 24.

Further to this end, sealing assembly of the nipple valve 26 with the manifold 24 is effected by a fastener member designated generally by the reference numeral 60. This fastener 60 comprises a bolt having an externally threaded shank portion 62 and an enlarged driver head portion 64, which in the illustrated embodiment comprises a conventional hex head. Cooperatively, the bore 46 carries an internal or female thread 57 for threadingly engaging the threaded shank portion 62 of the bolt 60. This thread 57 is formed axially outwardly of the shoulder 55 which receives the seal member 52. Accordingly, advancement of the bolt 60 with respect to the threads 57 urges the valve body halves 40, 42 into surrounding engagement with the manifold 24. At the same time, the seal members 52, 54 are also urged into sealing engagement with the manifold 24 about the respective apertures 28, 30. This is accomplished by the compressive action upon these seal members 52, 54 by the driver head 66 on the one side and the shoulder 55 on the other side as the valve body halves 40,42 are urged together by the fastener 60.

The axially inner surface 66 of the hex head 64 is preferably flat for engagement with the flat axially outer surface 56 of the valve body or housing half 40. Consequently, this driver head surface 66 also bears directly against the seal member 54 to accomplish a slight compression thereof to promote the sealing engagement with the manifold 24, about the aperture 28. It will also be noted that the inner diameter of each of these sealing members 52 and 54 is preferably approximately equal to the diameter of the respective apertures 28 and 30 about which these seal members 52, 54 are urged by the fastener 60. Additionally, the wall thickness of each cylindrical seal 52, 54 is at least equal to or slightly greater than one-half of the difference between the inner diameter of the associated bore 44 or portion of bore 46 and the diameter of the fastener 60, to effect sealing therebetween.

In accordance with a further feature of the invention, and as best seen in FIG. 6, the fastener member 60 also cooperates with the manifold 24 and nipple valve 26 to define a flow path for water from the manifold 24 to and through the nipple valve 26. In this regard, the fastener 60 is provided with a central, axial bore 68 which extends substantially on the order of two-thirds of the length of the shank portion 62 thereof. A side bore 70 formed in the threaded shank portion 62 feeds into this central axial bore 68. As best seen in FIG. 4, when the bolt 60 is assembled with other parts of the nipple valve 26, the side bore 70 is substantially centrally located within the pipe or manifold 24 to permit the flow of water therethrough to the axial bore 68 and thence to the interior of the housing half 42.

The remaining portions of the nipple waterer 26 and in particular those associated with the housing half 42 are conventional and need not be fully described. Suffice it to say, however, that the water delivered through the bore 68 of the fastener 60 enters the axial through bore 46 of the housing half 42. This axial through bore is stepped down somewhat as indicated at reference numeral 74 to receive a suitable resilient compression member such as a spring 76. This spring 76 bears against an enlarged head portion 78 of a stem or paddle 80 which comprises a generally cylindrical pin member. The opposite end of this enlarged head portion of the stem 80 bears against another decreased diameter shoulder 82 of the through bore 46, and there is provided therebetween a suitable sealing member such as a flexible O-ring 84.

In accordance with conventional practice, a portion of the through bore 46 located axially outwardly of this shoulder 82 is of slightly greater diameter than the shank of the stem 80, and thereafter opens into an enlarged bore portion 86. This distal or axially outer end of the housing half 42 is then angularly truncated or cut away to permit gripping engagement in the mouth of a hog or other livestock, indicated generally in phantom line. Responsive to this gripping engagement the stem 80 tends to be angularly displaced or pivoted somewhat, which in turn causes the enlarged head portion 78 thereof to pivot inwardly against the compression spring 76 and out of engagement with the O-ring seal 84. This action then permits the flow of water from the through bore 46 to continue through the enlarged bore portion 86 to be delivered to the animal. It will be noted in this regard that the end of the compression spring 76 opposite the head portion 78 of the stem bears against the end of the fastener 60. In other respects, the structure including the spring 76, the stem 80 and the cutaway or angled outer portion of the housing half 42 are conventional and need not be described further herein.

In accordance with the foregoing descriptions, the method of assembly of the nipple valve waterer 26 with the water supply line or manifold 24 will be readily apparent. Briefly, it will be seen that the O-ring 84 may first be inserted against the shoulder 82 interiorly of the housing half 42. Thereafter, the stem 80 is inserted through the decreased diameter portion of the bore 46 at the shoulder 82 to seat upon the O-ring 84. The compression spring 76 may next be inserted in the bore portion 74 of the bore 46, whereupon the seal member 52 is seated against the shoulder portion 55 of the bore 46. With the foregoing assembly steps completed the housing half 42 may be positioned against the manifold 24 so that its through bore 46 and the sealing member 52 are in coaxial alignment with the through aperture 30 of the manifold 24. Next, the seal member 54 is inserted in the through bore 44 of the housing half 40, whereupon this later housing half 40 may be similarly positioned against the manifold 24, the through bore 44 thereof and seal member 54 being placed in coaxial alignment with the through aperture 28 of the manifold 24. Thereafter, the fastener member 60 and in particular the threaded shank portion 62 thereof is fed through the seal member 54 and hence through the bore 44 of housing half 40 by way of the openings 28, 30, through the manifold 24, and thence through the seal 52 and the surrounding through bore 46 of the housing half 42. Thereupon, the threads of shank 62 are threadably engaged with the complimentary internal or female threads 57 in the through bore 46. Thereupon the fastener may be rotated by means of a suitable tool engaged with the driver head portion 64 thereof until the housing halves 40 and 42 are tightly engaged in surrounding relationship with the manifold 24, with resultant compression and sealing action of the sealing members 52 and 54.

What has been illustrated and described herein is a novel and improved nipple valve-type waterer including novel structure for coupling with a water supply line or manifold. Those skilled in the art may devise various alternatives, changes and modifications upon reading the foregoing descriptions. Accordingly, the invention includes such alternatives, changes and modifications insofar as they fall within the spirit and scope of the appended claims.

We claim:

1. In a watering system including a substantially cylindrical tubular manifold for delivery of water, a nipple valve waterer for interfitting with said tubular manifold and comprising: a valve body including substantially cylindrical, tubular means including means for surroundingly engaging said tubular manifold, and means forming a flow path from said tubular manifold to said tubular means for delivery of water from said tubular manifold to said nipple valve waterer and means for sealing the junction between said tubular means and said manifold to substantially prevent leakage, wherein said means surroundingly engaging said tubular manifold comprises at least a portion of said tubular means of greater diameter than the diameter of said cylindrical tubular manifold and means defining a through transverse opening in said tubular means portion of substantially similar diameter to the cross-sectional outer diameter of said cylindrical tubular manifold, and wherein said means forming a flow path includes a pair of oppositely aligned through openings in a peripheral wall of said tubular manifold and wherein said tubular means comprises first and second valve body halves, each comprising a substantially cylindrical, tubular member having a through axial bore and each having an axially outer end thereof formed with an arcuate face for interfitting with said manifold peripheral wall in surrounding relation thereto said arcuate faces defining said through transverse opening, and said through axial bores intersecting said through openings in said manifold.

2. A nipple valve waterer according to claim 1 wherein said through axial bore in each of said two valve body halves is of equal or greater diameter than said aligned through openings in said manifold peripheral wall at least in the portions thereof that intersect said arcuate faces, for surroundingly engaging said through openings in said manifold peripheral wall.

3. A nipple valve waterer according to claim 1 wherein said sealing means comprises a substantially cylindrical, tubular seal member of elastomeric material carried within said through axial bore of each of said valve body halves for sealingly engaging the junction between said valve body half and its associated through opening in said manifold peripheral wall and means for urging said seals against said junction.

4. A nipple waterer according to claim 3 wherein said urging means includes a shoulder portion in said through axial bore of one of said valve body halves, the depth of said shoulder relative to said arcuate face being slightly less than the axial length of one of said cylindrical seal members, and fastener means passing through and bearing against the other of said seal members and for urging said valve body halves together in surrounding relation to said manifold and thereby urging said seals into sealing engagement with said manifold through openings, said other seal member being of slightly greater axial length than the through axial bore of the other of said two valve body halves.

5. A nipple valve waterer according to claim 4 wherein said fastener means comprises an elongated bolt member having a threaded shank portion of smaller diameter than said through openings in said manifold peripheral walls and said through axial bores, and extending through the seal member in said other valve body half, through said manifold and through said cylindrical seal member in said one valve body half, said one valve body half further including internal thread means in the through axial bore thereof for engagement with said threaded fastener shank portion.

6. A nipple valve waterer according to claim 5 wherein said fastener means has an enlarged head portion for bearing against the otherwise free end of said first valve body half, thereby cooperating with said threaded shank portion thereof and said internal thread means of said second valve body half for urging said valve body halves and said seal means into sealing engagement and in surrounding relation with said manifold.

7. A nipple valve waterer according to claim 4 wherein said fastener means further includes an axial bore and side bore means communicating with said axial bore and comprising therewith a portion of said flow path defining means.

8. A nipple valve waterer for use with a substantially cylindrical, tubular manifold having at least one pair of opposing, coaxially aligned through openings in a peripheral wall thereof, said nipple valve waterer comprising first and second valve body halves, each comprising a substantially cylindrical, tubular member of greater diameter than said cylindrical tubular manifold and each having a through axial bore, one axial end of each said valve body half having an arcuate face intersecting said through bore, said arcuate faces of each of said pair of said opposed, coaxially aligned valve body halves cooperating for interfitting with said manifold in surrounding engagement therewith, with said through bores substantially in coaxial alignment with said manifold peripheral wall through openings, seal means for sealing the junction between said valve body halves and said openings in said manifold and means defining a flow path for water from said manifold to and through said nipple valve waterer.

9. A livestock watering system comprising: a substantially cylindrical, tubular manifold for delivery of water, at least one pair of opposing, coaxially aligned through openings in a peripheral wall of said manifold, a valve waterer comprising a substantially cylindrical, tubular valve body, means in said valve body for surroundingly engaging said tubular manifold, means forming a flow path from the tubular manifold to said tubular valve body for delivery of water therebetween, and means for sealing the area of engagement between said tubular valve body and said manifold to substantially prevent leakage, said means surroundingly engaging said tubular manifold comprising at least a portion of said tubular valve body of greater diameter than the diameter of said cylindrical tubular manifold and means defining a through transverse opening in said greater diameter tubular valve body portion of substantially similar diameter to the cross-sectional outer diameter of said cylindrical tubular manifold.

10. A watering system according to claim 9 wherein said valve body comprises first and second valve body halves, each comprising a substantially cylindrical, tubular member having a through axial bore and each having an axially outer end thereof formed with an arcuate face, said arcuate faces together interfitting with said manifold in surrounding relation thereto and comprising said means defining said through transverse opening in said tubular valve body, and said through axial bores being capable of alignment with said through openings in said manifold.

11. A livestock watering system according to claim 9 or claim 10 wherein said manifold comprises an elongate tubular member formed to define a polygon and further including a plurality of like valve waterers, each occupying one side of the polygon defined by said manifold.

12. A watering system including a tubular manifold having a hollow interior and a valve waterer for interfitting with the tubular manifold, the valve waterer including two body elements, each body element having an arcuate face adapted to engage the tubular manifold, fastener member means extending through one body element, through the tubular manifold and manifold interior, and into another body element for drawing the valve elements toward one another around the tubular manifold, at least one fluid flow path being defined in the fastener member and extending from the tubular manifold interior to the interior of one body element for delivering fluid from the manifold interior to that body element.

13. A watering system according to claim 12 further including sealing means between each body element and manifold for discouraging fluid leaks from the manifold.

14. A watering system according to claim 13 wherein said sealing means extends around at least a portion of said fastener means.

15. A watering system according to claim 13 wherein said sealing means is interposed between said fastener member, said body elements, and the tubular manifold.

16. A watering system according to claim 12 wherein said fastener means includes an enlarged head element for engaging one body element and a threaded element for engaging the other body element.

17. A watering system according to claim 12 further including nipple valve means mounted in and on that body element to which the fluid is delivered for controlling the flow of fluid from the tubular manifold and valve waterer.

* * * * *